(12) United States Patent
Leonelli, Jr.

(10) Patent No.: US 7,734,171 B2
(45) Date of Patent: Jun. 8, 2010

(54) SNAP-IN RETAINER FOR A SENSOR SYSTEM

(75) Inventor: Frank Paul Leonelli, Jr., Goleta, CA (US)

(73) Assignee: Autoliv ASP, Inc., Ogden, UT (US)

( * ) Notice: Subject to any disclaimer, the term of this patent is extended or adjusted under 35 U.S.C. 154(b) by 159 days.

(21) Appl. No.: 12/021,573

(22) Filed: Jan. 29, 2008

(65) Prior Publication Data

US 2009/0190915 A1 Jul. 30, 2009

(51) Int. Cl.
*G03B 17/02* (2006.01)
*H04N 5/225* (2006.01)

(52) U.S. Cl. ..................... 396/535; 348/374
(58) Field of Classification Search .............. 396/429, 396/535; 348/340, 373, 374; 257/726, 727, 257/731, 718, 721; 29/754, 760, 761
See application file for complete search history.

(56) References Cited

U.S. PATENT DOCUMENTS

| 6,654,064 | B2 * | 11/2003 | Ishikawa | 348/374 |
| 2005/0025479 | A1 * | 2/2005 | Kurosawa | 396/535 |
| 2005/0073602 | A1 | 4/2005 | Kumoda et al. | |
| 2005/0206727 | A1 * | 9/2005 | Kormos | 348/148 |
| 2007/0069134 | A1 | 3/2007 | Cassel et al. | |

FOREIGN PATENT DOCUMENTS

JP 2005-122063 A 5/2005

* cited by examiner

*Primary Examiner*—W. B. Perkey
*Assistant Examiner*—Minh Q Phan
(74) *Attorney, Agent, or Firm*—Sally J Brown; Brinks Hofer Gilson & Lione

(57) ABSTRACT

A system for retaining a sensor assembly includes a mounting plate having a mounting area for the sensor assembly, a sensor assembly having a sensor assembly plate with a perimeter, and a retainer ring having at least one spring member. The at least one spring member of the retainer ring is configured to bias the sensor assembly substantially toward at least one datum, such that a portion of the perimeter of the sensor assembly plate is directly adjacent to the at least one datum.

11 Claims, 4 Drawing Sheets

SNAP-IN RETAINER FOR A SENSOR SYSTEM

BACKGROUND OF THE INVENTION

1. Field of the Invention

The invention relates to sensor (camera) systems for automobile applications and more particularly to infrared ("IR") sensor systems for automobile applications.

2. Description of the Known Art

Some modern automobiles include sensor systems, more particularly, IR sensor systems which are located under the hood of the vehicle, with the field of view of the sensor system pointing forwardly of the vehicle. Normally, the sensor system is used to acquire an image of the scenery in front of the automobile. This image will help the driver of the automobile to see, particularly in the case of relatively warm objects (such as pedestrians and large animals), in dark conditions. The image from the sensor system could also be processed to identify and mark objects that should be observed by the driver. Clearly, accurate readings are needed from the sensor system for such a system to function effectively.

Imaging or sensing systems using a camera may also be used to produce inputs for safety or vehicle control systems which may not present any image to the driver. Examples of such systems include obstacle detection systems to trigger vehicle occupant or pedestrian safety systems, closing velocity or range sensing for engine shutdown control, parking assist systems, lane departure systems and vehicle blind spot detection systems.

Sensor systems generally include a sensor assembly containing a detector with multiple pixel array. Additionally, an optical arrangement is utilized such that scene energy received by the optical arrangement is directed to the sensor assembly. In order for scene energy to be properly directed from the optical arrangement to the sensor assembly, the sensor assembly must be carefully positioned so as to properly align the scene on the sensor array and with the optical center and maximize the amount of energy received from the optical arrangement during assembly. Prior art solutions have generally required that the sensor assembly be carefully aligned. This alignment is generally achieved by first determining the location of the center pixel of the sensor assembly. Thereafter, the sensor assembly is aligned with the aid of an alignment spring, gasket, retainer, and fasteners so that the center pixel is located such that it is at the center of the image directed by the optical arrangement. This system and method for aligning the sensor assembly is costly and is fairly difficult to consistently achieve. Therefore, there is a need for an improved system for aligning the sensor assembly.

BRIEF SUMMARY OF THE INVENTION

An embodiment of the sensor system in accordance with the present invention includes a mounting plate, a sensor assembly and a retainer ring. The mounting plate includes a mounting area for the sensor assembly and at least one feature forming a datum generally located outside the mounting area. The sensor assembly includes a sensor assembly plate with a perimeter and a sensor housing. The sensor assembly plate has a front side and a back side, with the back side of the sensor assembly plate being adjacent to the mounting area of the mounting plate and the sensor housing being located on the front side of the sensor assembly plate. The retainer ring includes at least one spring member and is coupled to the mounting plate so as to retain the sensor assembly to the mounting plate.

It is important to note that the sensor array is precisely positioned with 2 sides of the sensor perimeter so that as when a portion of the perimeter of the sensor assembly plate engages at least one datum, the center pixel of the sensor assembly will be positioned so as to be in the center of the viewing area of an optical arrangement. In order to bias sensor assembly so that a portion perimeter of the sensor assembly plate engages the at least one datum, the least one spring member of the retainer ring is configured to bias the sensor assembly substantially toward the at least one datum, such that a portion of the perimeter of the sensor assembly plate is directly adjacent to the at least one datum.

These and other aspects and advantages of the present invention will become apparent upon reading the following detailed description of the invention in combination with the accompanying drawings.

DETAILED DESCRIPTION OF THE INVENTION

Figure 1:
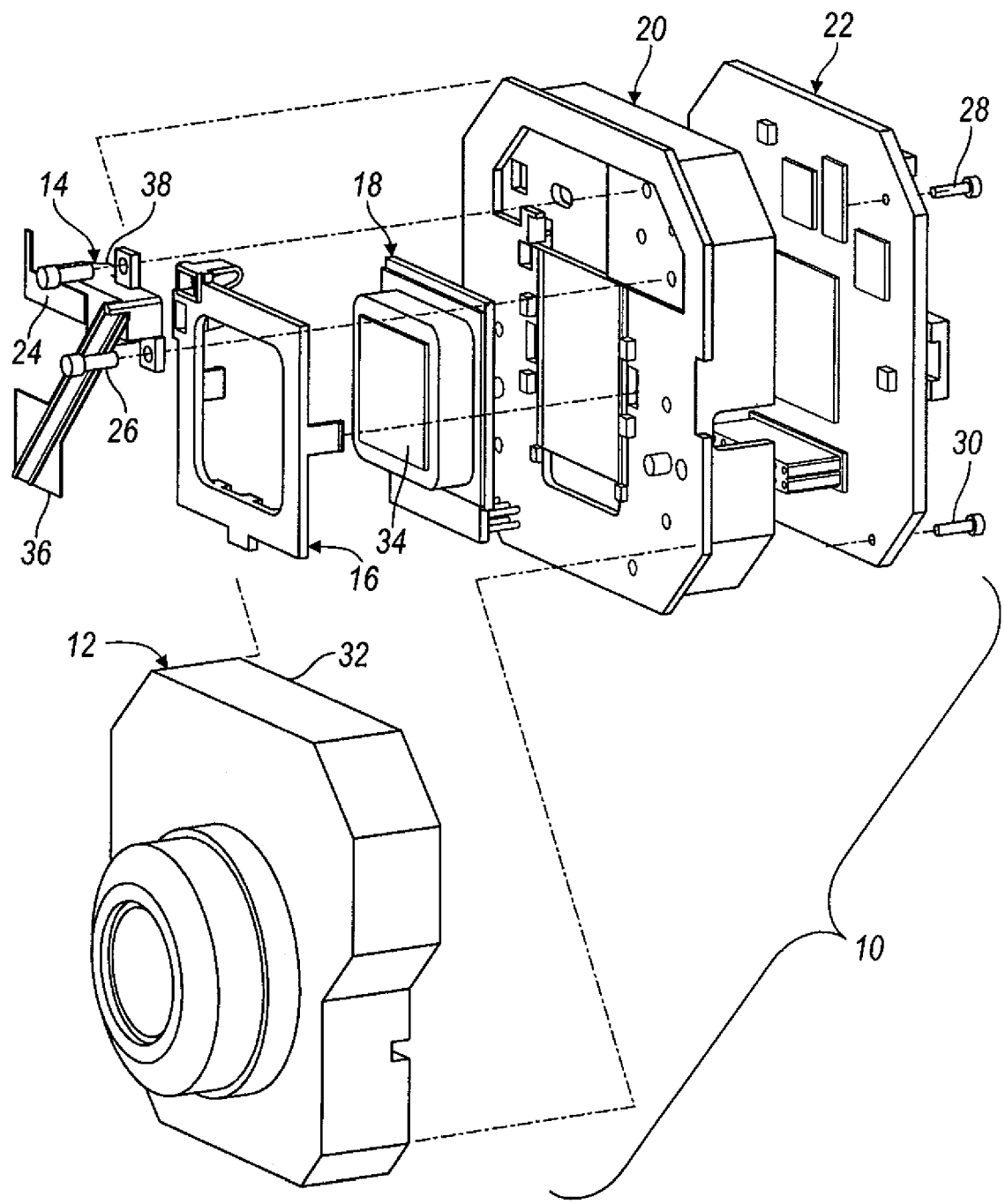
FIG. 1 illustrates an exploded view of a sensor system core assembly embodying the principles of the present invention.

FIG. 1 illustrates an exploded view of a sensor system core assembly 10. The sensor system core assembly 10 generally includes an optical arrangement 12, a shutter mechanism 14, a retainer ring 16, a sensor assembly 18, a mounting plate 20, and a circuit board 22. As will be later explained in greater detail, the retainer ring 16 retains the sensor assembly 18 to the mounting plate 20. Screws 24 and 26 retain the shutter assembly 14 to the mounting plate 20 and screws 28 and 30 retain the optical arrangement 12 to the circuit board 22. The optical arrangement 12 includes a housing 32 that encapsulates the shutter mechanism 14, retainer ring 16, and sensor assembly 18, such that when the optical arrangement 12 is attached to the circuit board 22 via the screws 28 and 30, the housing 32 will encapsulate the shutter mechanism 14, retainer ring 16, and sensor assembly 18.

The optical arrangement 12 is configured to focus incoming scene energy a sensor array 34 forming part of the sensor assembly 18. The optical arrangement 12 may comprise a number of lenses and/or mirrors, as will be understood by a person of skill in the art. A description of this optical assembly is shown and described in U.S. patent application Ser. No. 11/225,419 to Cassel et al., the entirety of which is hereby incorporated by reference.

The shutter mechanism 14 includes a shutter 36 and a shutter control system 38. As it is well understood in the art, the shutter 36 functions to block light received by the optical arrangement 12 from being directed to the sensor array 34 of the sensor assembly 18. The shutter control system 38 is capable of moving the shutter 36 such that light received by the optical arrangement 12 may be prevented or allowed to reach the sensor array 34 of the sensor assembly 18.

Figure 2:
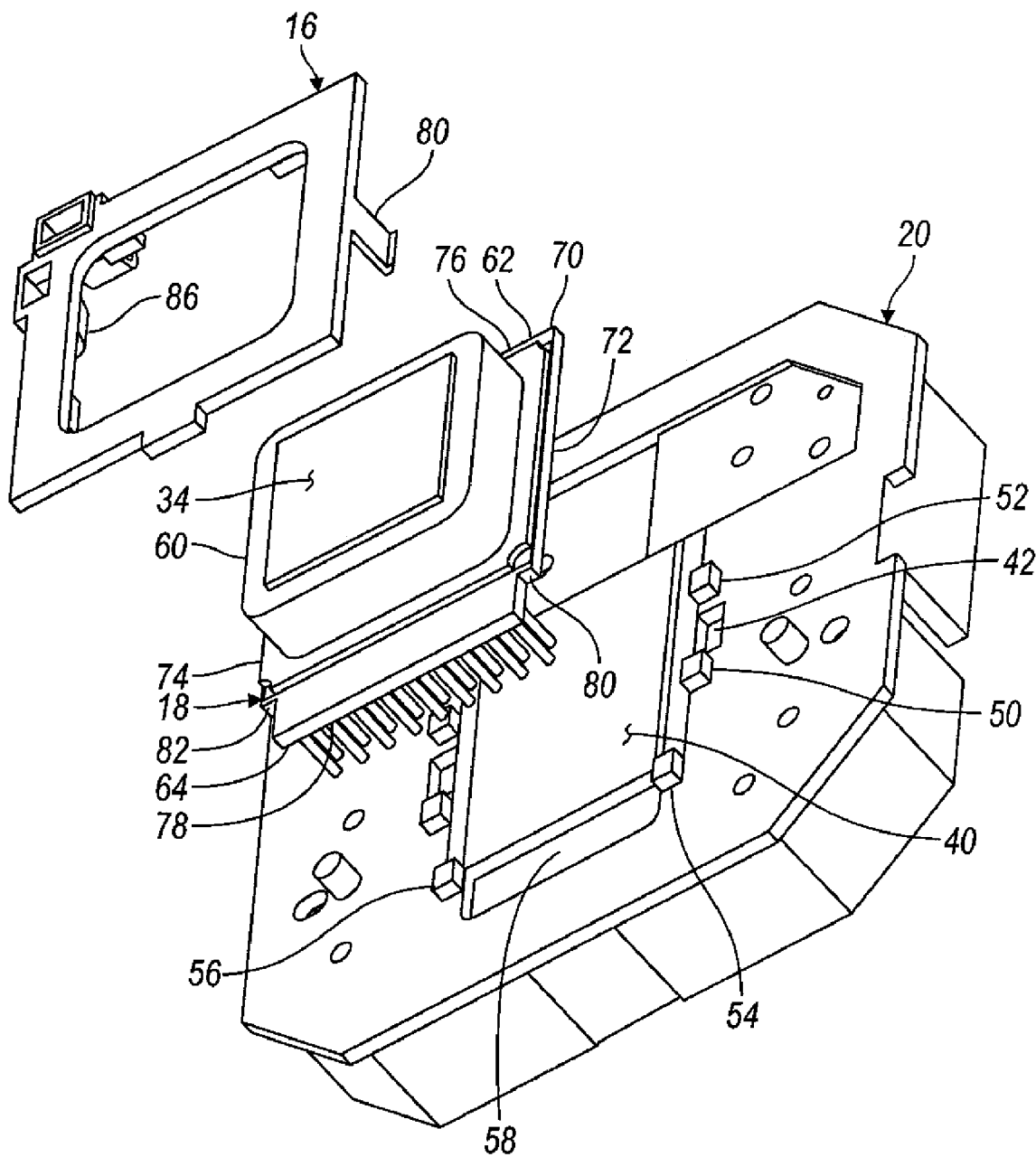
FIG. 2 illustrates an exploded view of a retainer ring, sensor assembly and mounting plate of the sensor system.
Figure 3:
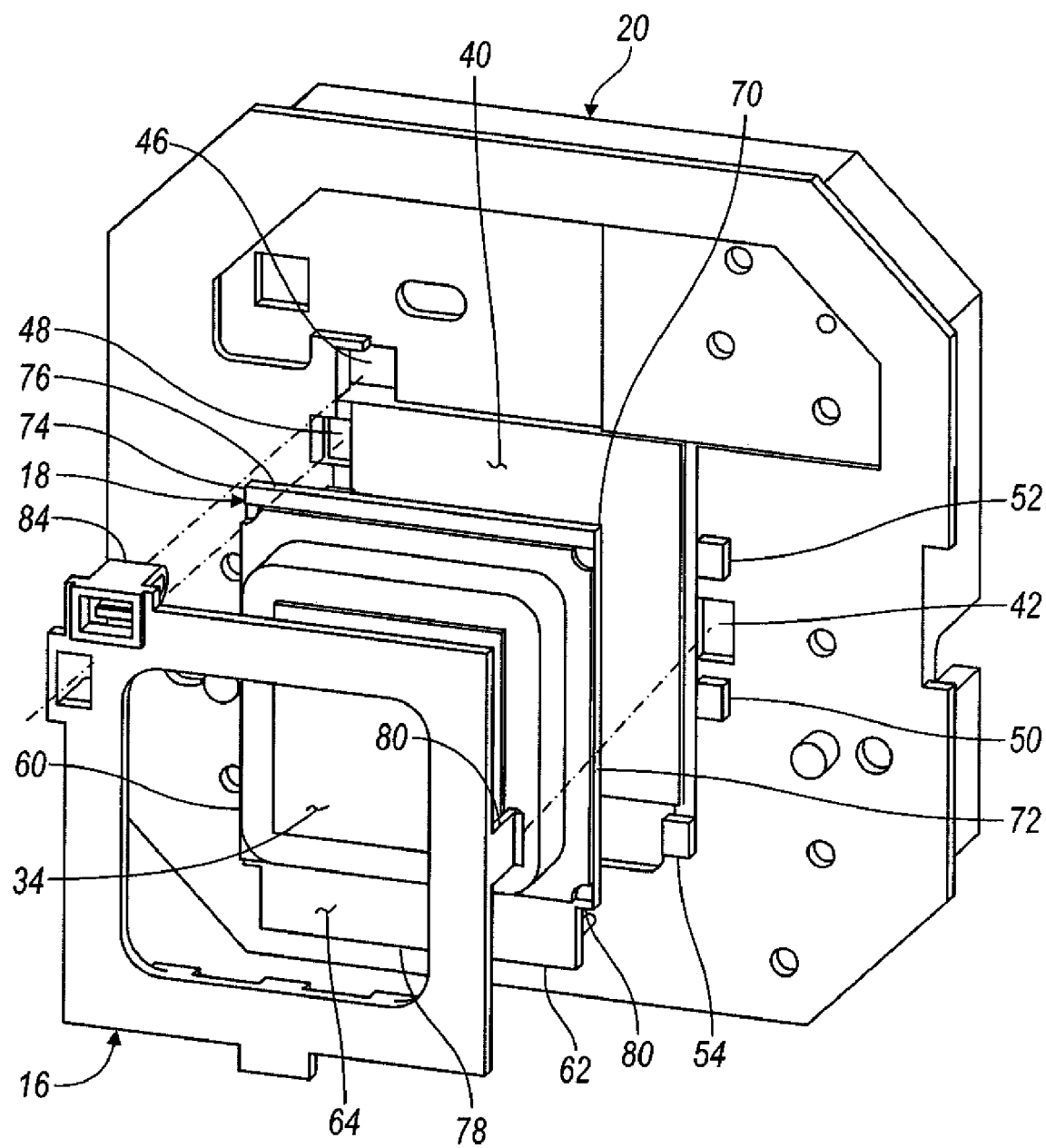
FIG. 3 illustrates another exploded view of the retainer ring, sensor assembly and mounting plate of the sensor system.
Figure 4:
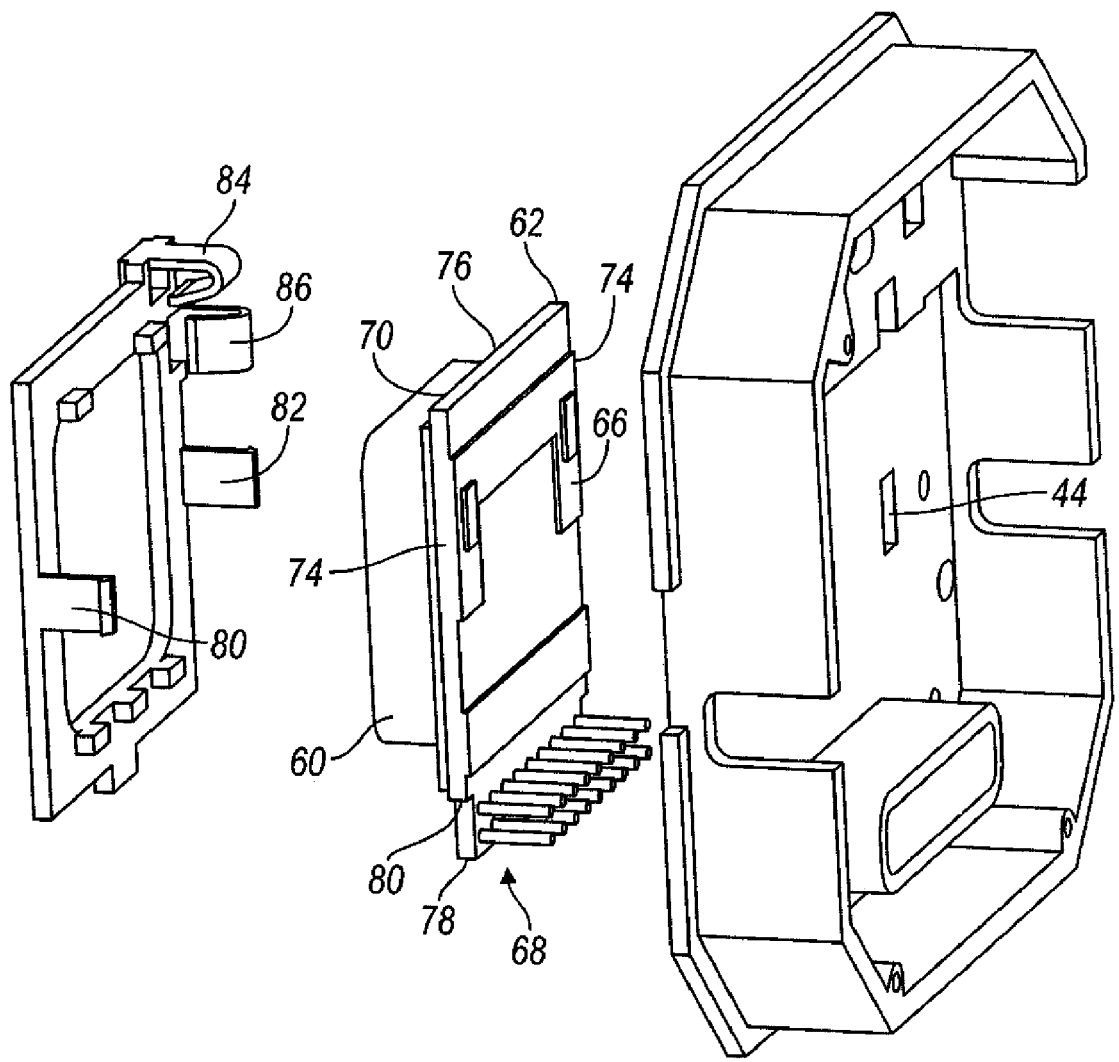
FIG. 4 illustrates still another exploded view of the retainer ring, sensor assembly and mounting plate of the sensor system.

Referring to FIGS. 2-4, a more detailed view of the retainer ring 16, sensor assembly 18, and mounting plate 20 is shown. The mounting plate 20 generally functions as a heat sink for the sensor assembly 18 and is therefore preferably made out of a thermally conductive material, such as metal. The mounting plate 20 generally includes a mounting area 40 for mounting the sensor assembly 18, first and second retainer ring slots 42 and 44, a top spring slot 46, a slide spring slide 48. Outside of the mounting area 40 is located side datum 50 and 52 and bottom datum 54 and 56. Finally, the mounting plate 20 also includes a connector opening 58. The datums 50, 52, 54 and 56 are features formed out of the mounting plate 20. Generally, the datums 50, 52, 54 and 56 are essentially surfaces protruding out of the mounting plate 20. However, the datum 50, 52, 54 and 56 may be separate entities attached to the mounting plate 20.

As stated previously, the sensor assembly 18 includes a sensor array 34. The sensor array 34 is generally located in a sensor array housing 60. The sensor assembly 18 also includes a sensor assembly plate 62, which may be made from a ceramic material. The sensor assembly plate 62 has a front side 64 and a back side 66. The sensor array housing 60 is generally located on the front side 64 of the sensor assembly plate 62. Protruding from the back side 66 of the sensor assembly plate 62 are a plurality of connector pins 68 that are in communication with the sensor array 34 of the sensor assembly 18. When the back side 66 of the sensor assembly plate 62 is located directly adjacent to the mounting area 40 of the mounting plate 20, the plurality of pins 68 extend into the connector opening 58 of the mounting plate 20.

The sensor assembly plate 62 also includes a perimeter 70 surrounding the periphery of the sensor assembly plate 62. Generally, the sensor assembly plate 62 is substantially rectangular and therefore has a first side perimeter 72, a second side perimeter 74 as well as a top side perimeter 76 and a bottom side perimeter 78. The bottom side perimeter 78 may include a first step 80 and a second step 82. When the backside 66 of the sensor assembly plate 62 is adjacent to the mounting area 40, the first and second steps 80 and 82 will engage bottom datums 54 and 56, respectively. In like manner, the first side perimeter 72 will engage side datums 50 and 52. It is important to note that the steps 80 and 82 as well as the side perimeter 72 are precisely made so that as when the side perimeter engages the side datums 50 and 52 and the steps 80 and 82 engage the bottom datums 54 and 56, the center pixel of the sensor array 34 will be positioned so as to be in the center of the viewing area of the optical arrangement 12.

However, in order for the side perimeter 72 and steps 80 and 82 to engage the side datums 50 and 52 and the bottom datums 54 and 56, respectively, the sensor assembly 18 must be bias substantially towards the datums 50, 52, 54, and 56 such that the side perimeter 72 engages the side datums 50 and 52 and the steps 80 and 82 engage the bottom datums 54 and 56. As such, the retainer ring 16 has been specially designed so as to bias the sensor assembly 18 towards the datums 50, 52, 54, and 56.

The retainer ring 16 includes first side retainer clip 80 and second side retainer clip 82. The first side and second side retainer clips 80 and 82 are one way retainer clips that engage the first and second retainer clip slots 42 and 44, respectively. Essentially, the retainer clip 80 and 82 are snap-in retainer clips. By engaging the first and second retainer clip slots 42 and 44, the retainer ring 16 will then be attached to the mounting plate 20, thus retaining the sensor assembly 18 between the retainer ring 16 and the mounting plate 20.

The retainer ring 16 also includes a top spring member 84 and a side spring member 86. The top spring member 84 and side spring member 86 protrude into the mounting plate 20 through the top spring slot 46 and side spring slot 48, respectively. The top spring member 84, and side spring member 86 are essentially "C" springs. The spring members 84 and 86 press against the top perimeter 76 and second side perimeter 74 so as to bias the sensor assembly 18 substantially toward the datums 50, 52, 54, and 56. To be more specific, the top spring member 84 biases the sensor assembly 18 toward the bottom datums 54 and 56, while the side spring member 86 biases the sensor assembly 18 toward the side datums 50 and 52. Generally, the retainer ring 16 is made out of a plastic material but may also be made out of a metallic material. Additionally, it should be understood that the spring members 84 and 86, as well as the retainer clips 80 and 82, are generally integrally formed with the retainer ring 16.

As a person skilled in the art will readily appreciate, the above description is meant as an illustration of the principles this invention. This description is not intended to limit the scope or application of this invention in that the invention is susceptible to modification, variation and change, without departing from spirit of this invention, as defined in the following claims.

The invention claimed is:

1. A system for retaining a sensor assembly, the system comprising:
   a mounting plate having a mounting area for the sensor assembly, the mounting plate having at least one datum, the at least one datum being located outside the mounting area;
   the sensor assembly having a sensor assembly plate with a perimeter and a sensor housing, the sensor assembly plate having a front side and a back side, the back side of the sensor assembly plate being adjacent to the mounting area of the mounting plate, the sensor housing being located on the front side of the sensor assembly plate;
   a retainer ring having at least one spring member, the retainer ring coupled to the mounting plate, the retainer ring being configured to retain the sensor assembly to the mounting plate;
   wherein the at least one spring member of the retainer ring is configured to bias the sensor assembly substantially toward the at least one datum in a direction that is substantially parallel to a plane defined by the mounting area, such that a portion of the perimeter of the sensor assembly plate is directly adjacent to the at least one datum.

2. The system of claim 1, wherein the at least one datum further comprises a side datum and a bottom datum.

3. The system of claim 2, wherein:
   the at least one spring member further comprises a top spring member and a side spring member;
   wherein the top spring member is configured to bias the sensor assembly substantially towards the bottom datum and the side spring member is configured to bias the sensor assembly substantially towards the side datum.

4. The system of claim 1, wherein the mounting plate is made of a thermally conductive material.

5. The system of claim 1, wherein the sensor assembly is an infrared thermal imaging sensor assembly.

6. The system of claim 1, wherein the at least one spring member is integrally formed with the retainer ring.

7. The system of claim 1, wherein the retainer ring is made of plastic.

8. The system of claim 1, wherein the retainer ring is made of a metallic material.

9. The system of claim 1, wherein the sensor assembly is mounted behind a front grill of an automobile.

10. The system of claim 1, wherein the sensor assembly is mounted adjacent to a fog light of an automobile.

11. The system of claim 1, wherein the retainer ring further comprises at least one retaining clip and the mounting plate further comprises at least one retaining slot, the at least one retainer clip configured to engage the at least one retaining slot for coupling the retainer ring to the mounting plate.

* * * * *